US011965432B2

(12) United States Patent
Kurt et al.

(10) Patent No.: US 11,965,432 B2
(45) Date of Patent: Apr. 23, 2024

(54) GUIDE VANE RING WITH WEAR ELEMENTS

(71) Applicant: Siemens Energy Global GmbH & Co. KG, Bayern (DE)

(72) Inventors: Nihal Kurt, Dusseldorf (DE); Fathi Ahmad, Kaarst (DE); Volker Vosberg, Mülheim an der Ruhr (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 27 days.

(21) Appl. No.: 17/788,932

(22) PCT Filed: Dec. 7, 2020

(86) PCT No.: PCT/EP2020/084894

§ 371 (c)(1),
(2) Date: Jun. 24, 2022

(87) PCT Pub. No.: WO2021/139939

PCT Pub. Date: Jul. 15, 2021

(65) Prior Publication Data

US 2023/0340886 A1 Oct. 26, 2023

(30) Foreign Application Priority Data

Jan. 7, 2020 (DE) ..................... 10 2020 200 073.5

(51) Int. Cl.
*F01D 9/04* (2006.01)

(52) U.S. Cl.
CPC ............. *F01D 9/042* (2013.01); *F01D 9/041* (2013.01); *F05D 2260/31* (2013.01)

(58) Field of Classification Search
CPC ........ F01D 9/042; F01D 9/041; F01D 11/001; F01D 11/005; F01D 11/006;
(Continued)

(56) References Cited

U.S. PATENT DOCUMENTS 3,070,353 A 12/1962 Welsh
4,126,405 A * 11/1978 Bobo ..................... F01D 9/042 415/115
(Continued)

FOREIGN PATENT DOCUMENTS

CN 102239311 A 11/2011
CN 104053858 A 9/2014
(Continued)

OTHER PUBLICATIONS

PCT International Search Report and Written Opinion of International Searching Authority dated Feb. 15, 2021 corresponding to PCT International Application No. PCT/EP2020/084894 filed Dec. 7, 2020.

*Primary Examiner* — Topaz L. Elliott
*Assistant Examiner* — Ryan C Clark
(74) *Attorney, Agent, or Firm* — Wolter Van Dyke Davis, PLLC

(57) ABSTRACT

A guide vane ring which is divided into an upper and into a lower guide vane ring half, with an inner ring which is split at least in two, has a substantially U-shaped cross section, and forms a radially outwardly open flow duct which extends in the circumferential direction and is delimited by way of an inner ring bottom wall and two inner ring side walls, and with a multiplicity of vane platforms which receive guide vanes, are arranged along the outer circumference of the inner ring, and have holding webs which in each case project radially inwards, are spaced apart from one another in the axial direction, and engage around the inner ring side walls from the outside, wherein wear elements are inserted into gaps which are present between holding webs and directly adjacently arranged inner ring side walls.

11 Claims, 5 Drawing Sheets

(58) Field of Classification Search
CPC .... F01D 5/3015; F01D 25/243; F01D 25/246; F01D 9/04; F05D 2260/31
See application file for complete search history.

(56) References Cited

U.S. PATENT DOCUMENTS

| | | | | | |
|---|---|---|---|---|---|
| 4,384,822 | A | 5/1983 | Schweikl et al. | | |
| 5,073,084 | A * | 12/1991 | Hirst | F01D 11/001 | 415/134 |
| 5,118,120 | A * | 6/1992 | Drerup | F16J 15/021 | 415/173.7 |
| 5,429,478 | A * | 7/1995 | Krizan | F01D 11/001 | 415/174.4 |
| 5,630,590 | A * | 5/1997 | Bouchard | F16J 15/3288 | 415/230 |
| 6,220,815 | B1 | 4/2001 | Rainous | | |
| 2006/0002787 | A1* | 1/2006 | Carlson | F01D 25/285 | 415/9 |
| 2006/0056963 | A1* | 3/2006 | Abadie | F01D 17/162 | 415/191 |
| 2006/0123797 | A1* | 6/2006 | Zborovsky | F16J 15/062 | 60/800 |
| 2008/0273964 | A1 | 11/2008 | Ellis | | |
| 2008/0279679 | A1 | 11/2008 | Morrison | | |
| 2011/0286851 | A1 | 11/2011 | Benkler | | |
| 2012/0128481 | A1 | 5/2012 | Baumas et al. | | |
| 2013/0028708 | A1* | 1/2013 | Jayana | F01D 11/006 | 415/110 |
| 2013/0039760 | A1* | 2/2013 | Burt | F01D 5/3015 | 416/97 R |
| 2014/0234111 | A1 | 8/2014 | Dungs | | |
| 2014/0334920 | A1 | 11/2014 | Cortequisse | | |
| 2015/0086361 | A1* | 3/2015 | Ahmad | F01D 5/30 | 416/1 |
| 2015/0377044 | A1 | 12/2015 | Congratel | | |
| 2016/0010488 | A1 | 1/2016 | Albers | | |
| 2016/0186611 | A1* | 6/2016 | Vetters | F01D 25/246 | 415/173.2 |
| 2016/0312642 | A1 | 10/2016 | Wagner | | |
| 2017/0152866 | A1* | 6/2017 | Griffin | F01D 25/246 | |
| 2017/0241276 | A1* | 8/2017 | Kampka | F01D 5/326 | |
| 2017/0241279 | A1* | 8/2017 | Schlemmer | F01D 9/042 | |
| 2020/0056485 | A1* | 2/2020 | Shemyatovskiy | F02C 3/06 | |
| 2020/0200032 | A1* | 6/2020 | Laroche | F01D 9/04 | |
| 2021/0017867 | A1* | 1/2021 | Whittle | F01D 9/041 | |

FOREIGN PATENT DOCUMENTS

| | | | |
|---|---|---|---|
| CN | 104141631 | A | 11/2014 |
| CN | 107438702 | A | 12/2017 |
| CN | 110030037 | A | 7/2019 |
| DE | 102011117755 | A1 | 5/2012 |
| EP | 0943785 | A1 | 9/1999 |
| EP | 1548233 | A1 | 6/2005 |
| EP | 2657454 | A1 | 10/2013 |
| EP | 2884052 | A1 | 6/2015 |
| EP | 3244017 | A2 | 11/2017 |
| EP | 3290648 | A1 | 3/2018 |
| GB | 2298680 | A | 9/1996 |

* cited by examiner

GUIDE VANE RING WITH WEAR ELEMENTS

CROSS REFERENCE TO RELATED APPLICATIONS

This application is the US National Stage of International Application No. PCT/EP2020/084894 filed 7 Dec. 2020, and claims the benefit thereof. The International Application claims the benefit of German Application No. DE 10 2020 200 073.5 filed 7 Jan. 2020. All of the applications are incorporated by reference herein in their entirety.

FIELD OF INVENTION

The invention relates to a guide vane ring which is divided into an upper and into a lower guide vane ring half, with an inner ring which is split at least in two, has a substantially U-shaped cross section, and forms a radially outwardly open flow duct which extends in the circumferential direction and is delimited by an inner ring bottom wall and two inner ring side walls, and with a multiplicity of vane platforms, which receive guide vanes, are arranged along the outer circumference of the inner ring, and each have retaining webs which project radially inward, are spaced apart from one another in the axial direction, and fit around the inner ring side walls from the outside.

BACKGROUND OF INVENTION

Guide vanes are used in axial flow turbines. Thus, a guide vane ring arranged on the stator, together with a rotor blade ring provided on the rotor, forms one stage of a turbine. The task of the guide vane is to direct the medium flowing through the turbine as effectively as possible onto the associated rotor blade. Normally, a guide vane ring has an inner ring, an outer ring, and a multiplicity of guide vanes extending between the inner ring and the outer ring. For reasons of assembly, the guide vane ring is divided into a lower and an upper guide vane ring half, for which reason the inner ring and the outer ring are also formed in at least two parts. The guide vanes comprise outer and inner vane platforms, between which the vane airfoils extend. The outer vane platforms are secured on the outer ring via radially outwardly projecting vane roots. In one type of guide vane ring, the inner vane platforms, at least of the upper guide vane ring half, have retaining webs which project radially inward, are spaced apart from one another in the axial direction, and fit around the inner ring from the outside. When the upper guide vane ring half and the lower guide vane ring half are joined together, these retaining webs are pushed from above onto the inner ring with slight play, which is normally about 2-3 mm, in such a way that they accommodate the inner ring between them. The inner ring has a substantially U-shaped cross section and forms a radially outwardly open flow duct which extends in the circumferential direction and is delimited by an inner ring bottom wall and two inner ring side walls. During turbine operation, a cooling medium flowing out of the vane airfoils of the guide vanes is introduced into this flow duct in order to then pass this cooling medium on in the direction of the rotor blades to cool the rotor blades. In practice, the inner ring serving as a coolant distributor is also frequently referred to as a preswirler.

During turbine operation, the turbine components wear out and must be repaired or replaced in the course of maintenance work. This also applies to the inner ring. Thus, for example, outer surface regions of the inner ring side walls which face the retaining webs of the guide vanes often exhibit wear phenomena due to deformations and/or loads occurring during operation, the repair of which is associated with great expense and leads to a significant lengthening of maintenance times.

SUMMARY OF INVENTION

Proceeding from this prior art, it is an object of the present invention to provide a guide vane ring of alternative construction with which the problems described above are at least partially eliminated.

To achieve this object, the present invention provides a guide vane ring of the type mentioned at the outset which is characterized in that wear elements are inserted into gaps present between the retaining webs and the inner ring side walls arranged directly adjacent. Wear elements of this kind compensate for the play which is present between the retaining webs and the inner ring side walls arranged directly adjacent and prevent direct contact between the retaining webs and the inner ring side walls, which can take place in the absence of such wear elements owing to vibrations of the individual components which are excited during turbine operation. On the one hand, wear is reduced by the use of wear elements according to the invention. On the other hand, the wear is primarily on the wear elements, which can be replaced quickly, easily and in an advantageous manner in the course of maintenance work. Repair of the inner ring in the region of the retaining webs is thus entirely eliminated or is very slight.

The wear elements are advantageously of plate-shaped design in order in this way to distribute the mechanical loads which occur over as large an area as possible, thereby further reducing the wear and impairment of the inner ring.

The wear elements are advantageously manufactured from the material from which the inner ring is manufactured or from a softer material in order to concentrate the wear primarily on the wear elements.

According to one embodiment of the present invention, each of the wear elements is detachably connected to a retaining web or to an inner ring side wall. Accordingly, the wear elements can be replaced quickly and easily in the course of maintenance work.

Preferably, each wear element is fastened to a retaining web or to an inner ring side wall using a screwed connection. In this way, a simple releasable connection is created. For this purpose, each wear element advantageously has at least one welded-on threaded bolt, which, for example, is guided through an opening in a retaining web or in the inner ring side wall and can be secured on the other side by a nut.

Depressions that receive wear elements can be provided on inner surfaces of retaining webs and/or on the outer surface of at least one inner ring side wall in order to ensure defined positioning of the wear elements during their installation.

According to one embodiment of the present invention, wear elements are inserted into gaps which are present between the retaining web guide projections and the inner ring side walls arranged directly adjacent, wherein the retaining web guide projections each project radially inward. Thanks to such guide projections, the assembly of the guide vane ring is made considerably easier.

BRIEF DESCRIPTION OF THE DRAWINGS

Further features and advantages of the present invention will become clear from the following description of an embodiment of a guide vane ring according to the invention with reference to the appended drawing. In the drawing.

DETAILED DESCRIPTION OF INVENTION

Identical reference numbers identify identical or similar components or component sections below.

Figure 1:
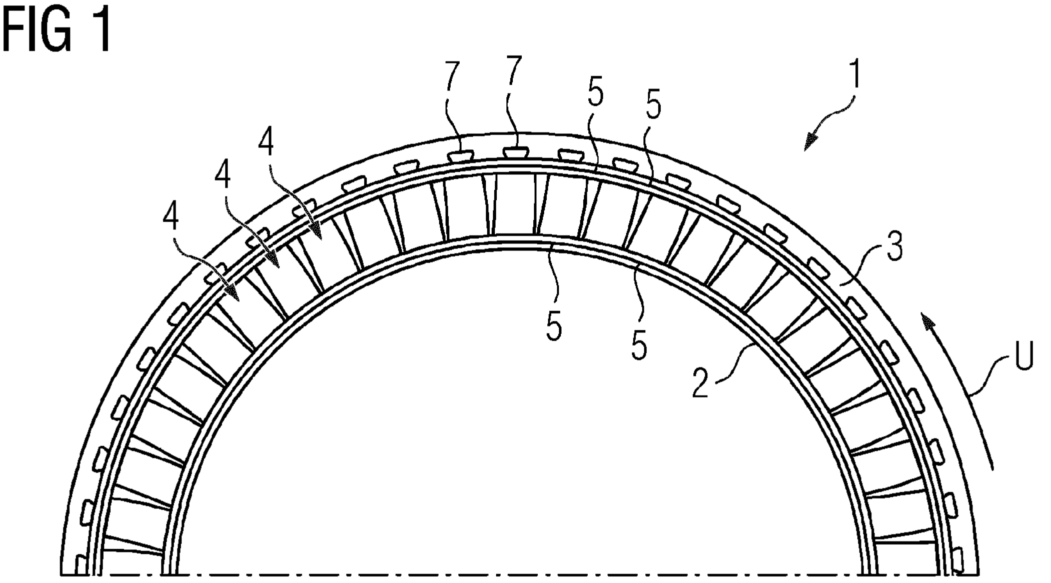
FIG. 1 is a schematic front view of an upper half of a guide vane ring according to one embodiment of the present invention.

FIG. 1 shows schematically an upper half of a guide vane ring 1, divided into an upper half and a lower half, according to one embodiment of the present invention, which is a guide vane ring for a turbine.

In the present case, the guide vane ring 1 has an inner ring 2 split into two, an outer ring 3 split into two, and a multiplicity of guide vanes 4 extending between the inner ring 2 and the outer ring 3.

The guide vanes comprise outer and inner vane platforms 5, between which the vane airfoils 6 extend. In the present case, an inner vane platform 5 and an outer vane platform 5 each accommodate two vane airfoils 6 between them, wherein the number of vane airfoils 6 extending between two vane platforms 5 can vary. The outer vane platforms 5 are secured on the outer ring 3 via radially outwardly projecting vane roots 7.

Figure 2:
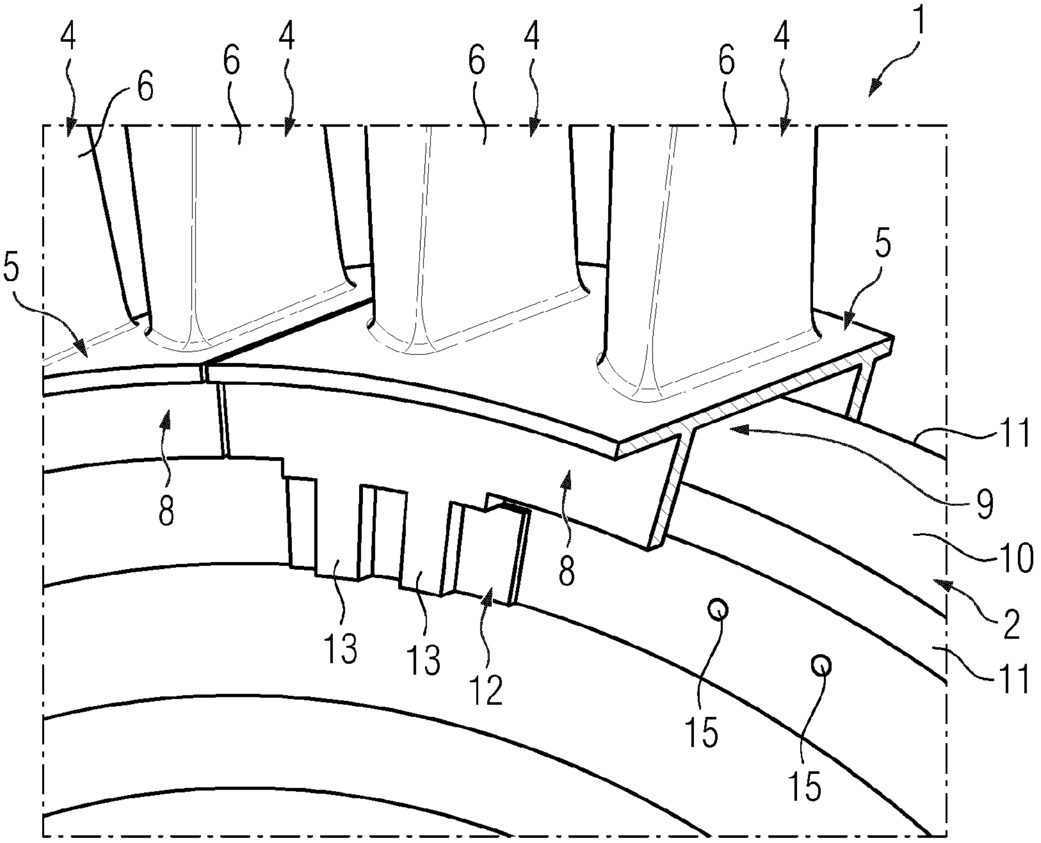
FIG. 2 is a perspective schematic partial view of the guide vane ring illustrated in FIG. 1 in the partially assembled state, which shows a wear element designed according to a first variant according to the invention.

The inner vane platforms 5, at least of the upper guide vane ring half, have retaining webs 8, which project radially inward, are spaced apart from one another in the axial direction, and fit around the inner ring 2 from the outside. When the upper guide vane ring half and the lower guide vane ring half are joined together, these retaining webs 8 are pushed from above onto the inner ring 2 with slight play, which is normally about 2-3 mm, in such a way that they accommodate the inner ring 2 between them. The inner ring 2, which in practice is also referred to as a preswirler, has, as shown in FIG. 2, a substantially U-shaped cross section and forms a radially outwardly open flow duct 9 which extends in the circumferential direction U and is delimited by an inner ring bottom wall 10 and two inner ring side walls 11. During turbine operation, a cooling medium flowing radially inward out of the vane airfoils 6 of the guide vanes 4 is introduced into this flow duct 9 in order to then pass this cooling medium on in the direction of the rotor blades to cool the rotor blades.

Wear elements 12 are inserted into the gaps which are present between the retaining webs 8 and the inner ring side walls 11, in each case arranged directly adjacent, and which, as already mentioned above, normally each have a gap width of about 2-3 mm. To be more precise, in the present case, the wear elements 12 are in each case inserted in gaps which extend between radially inwardly projecting retaining web guide projections 13 of the retaining webs 8 and the inner ring side walls 11 arranged directly adjacent. In the exemplary embodiment illustrated, the retaining webs 8 of the inner vane platform 5 each comprise two retaining web guide projections arranged at a distance from one another in the circumferential direction U, it being possible in principle for the number to vary.

Figure 3:
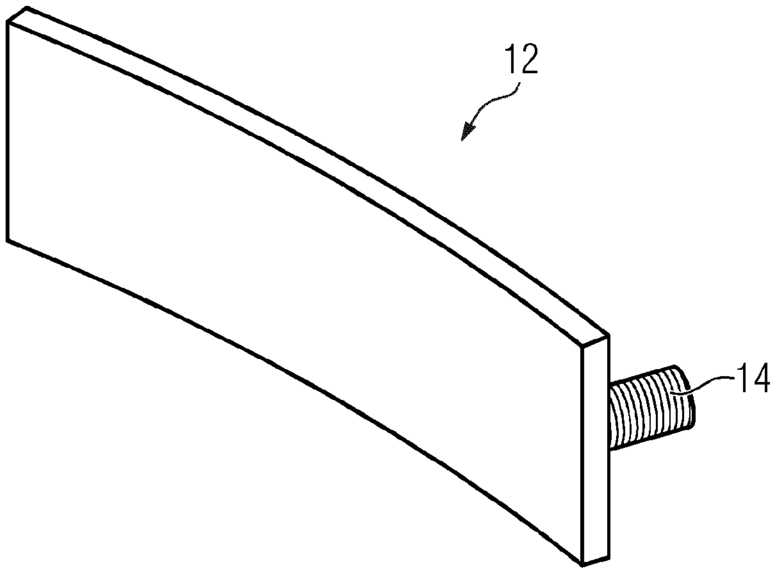
FIG. 3 is a perspective schematic front view of the wear element shown in FIG. 2.
Figure 4:
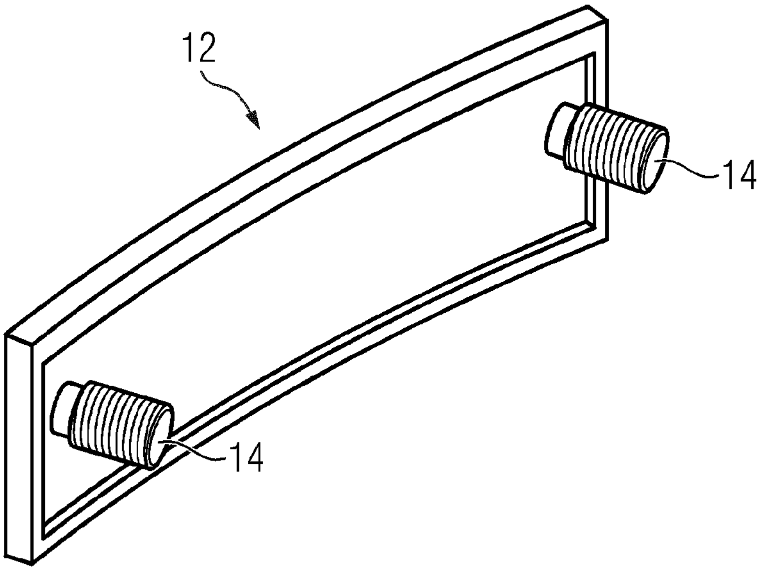
FIG. 4 is a perspective schematic rear view of the wear element shown in FIG. 2.
Figure 5:
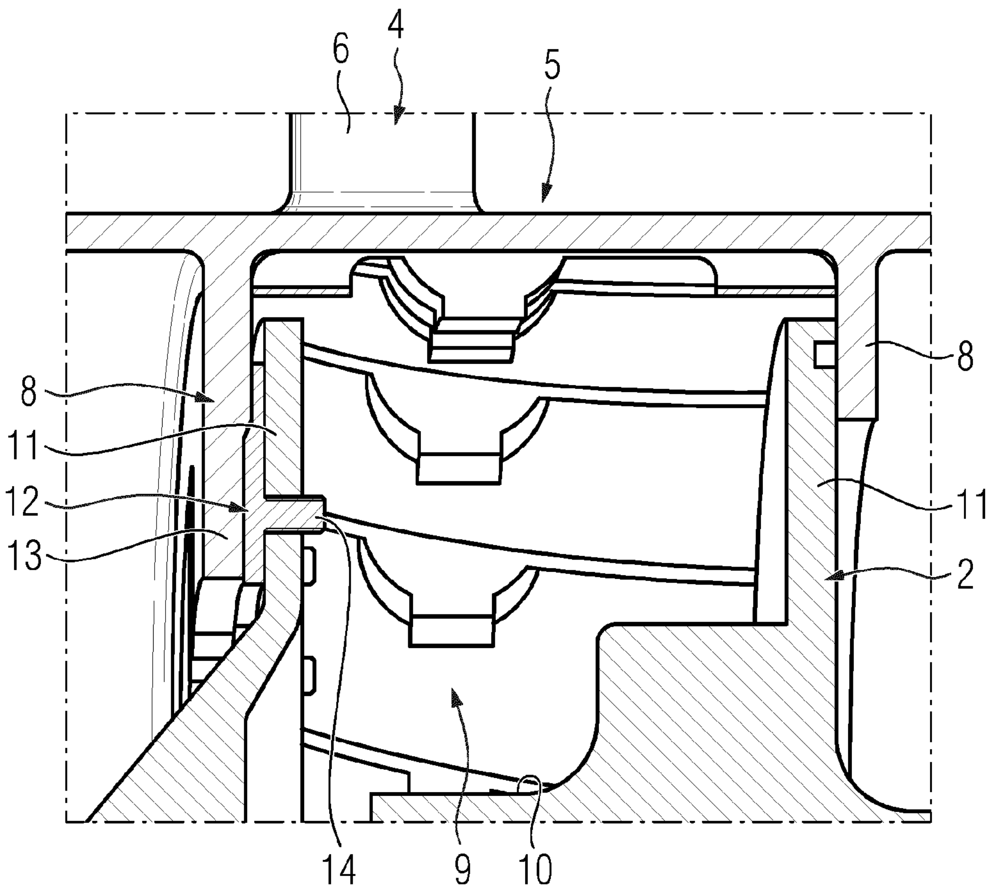
FIG. 5 is a perspective schematic sectional view of the guide vane ring illustrated in FIG. 1, which shows a wear element designed according to a second variant according to the invention.
Figure 6:
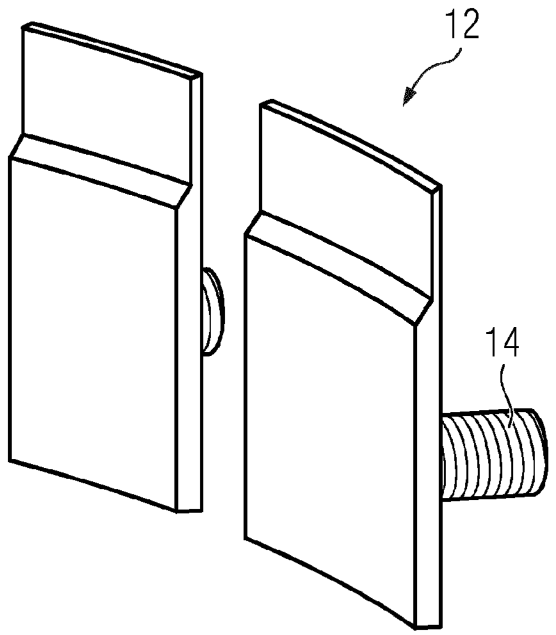
FIG. 6 is a perspective schematic front view of the wear element shown in FIG. 5.
Figure 7:
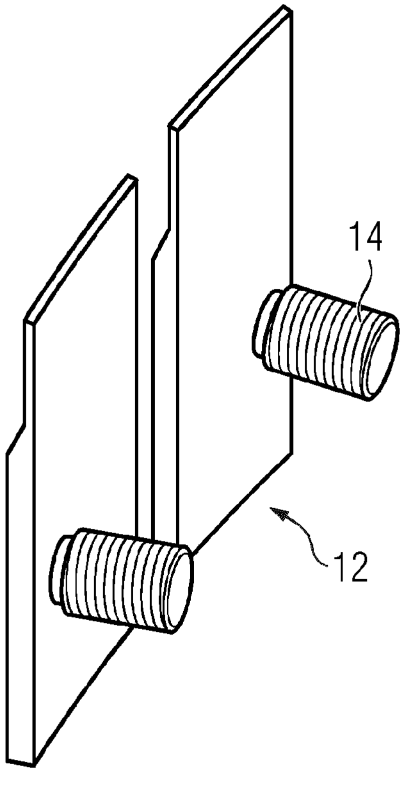
FIG. 7 is a perspective schematic rear view of the wear element shown in FIG. 5.
Figure 8:
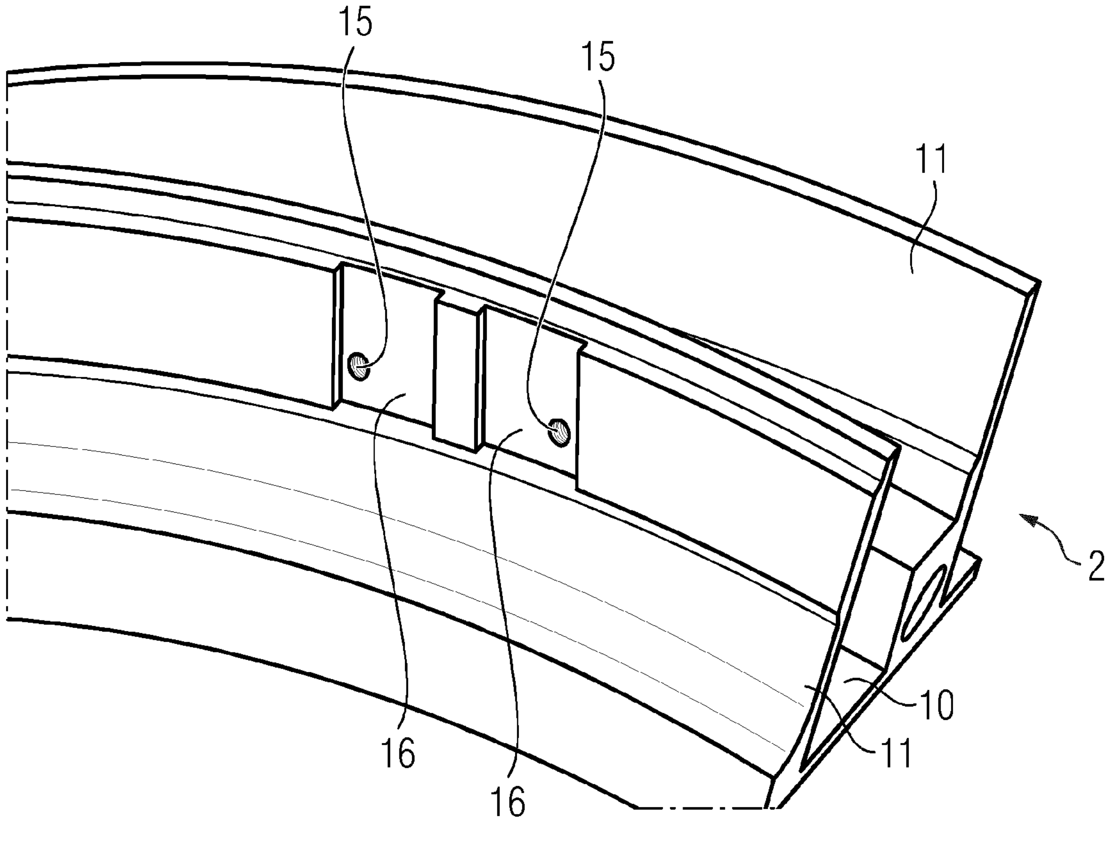
FIG. 8 is a perspective schematic partial view of an inner ring of the arrangement shown in FIG. 5.

The wear elements 12, one of which is shown in FIGS. 3 and 4, are each of plate-shaped design and have an outer contour in the form of a ring segment, which follows the shape of the inner ring 2. They are produced from the material from which the inner ring 2 is also manufactured.

Alternatively, the wear elements 12 can also comprise a softer material than the inner ring 2.

In the present case, each wear element 12 is detachably connected to an inner ring side wall 11. For this purpose, each wear element 12 is provided on the rear side with two welded-on threaded bolts 14, which extend through through-holes 15 in the inner ring 2 and are secured on the rear side by a nut (not illustrated specifically).

FIGS. 5 to 8 show a guide vane ring 1 according to a further embodiment of the present invention, which differs from the previously described embodiment primarily in the type of wear elements 12 used.

Two wear elements 12, which are each positioned between one of the retaining web guide projections 13 and the inner ring side wall 11 arranged directly adjacent, are used here for each retaining web 8. The contour of the front surface of each wear element 12 follows the contour of the facing surface of the associated retaining web guide projection 13. On the rear side, each wear element 8 is provided with a threaded bolt 14, which is welded on or secured in some other way. The inner ring side walls 11 are each provided with depressions 16, which receive the wear elements 12 in a positive-locking manner and in each of which a through-hole 15 for receiving a threaded bolt 14 is positioned.

In other respects, the structure of the guide vane ring 1 shown in FIGS. 5 to 8 corresponds to the structure described above with reference to FIGS. 1 to 4.

The wear elements 12 according to the invention compensate for the play which is present between the retaining webs 8 and the inner ring side walls 11 arranged directly adjacent and prevent direct contact between the retaining webs 8 and the inner ring side walls 11, which can take place in the absence of such wear elements 12 owing to vibrations of the individual components which are excited during turbine operation.

On the one hand, wear is reduced by the use of wear elements 12 according to the invention. On the other hand, the wear is primarily on the wear elements 12, which can be replaced quickly, easily and in an advantageous manner in the course of maintenance work. Repair of the inner ring 2 in the region of the retaining webs 8 is thus entirely eliminated or is very slight.

The wear elements 12 can be provided during the original production of a guide vane ring 1. They can also be added in the course of maintenance or repair work on an existing guide vane ring 1.

Although the invention has been illustrated and described in detail by means of the exemplary embodiment, the invention is not restricted by the examples disclosed, and other variants can be derived therefrom by a person skilled in the art without exceeding the scope of protection of the invention.

The invention claimed is:

1. A guide vane ring which is divided into an upper and into a lower guide vane ring half, with an inner ring which is split at least in two, has a U-shaped cross section, and forms a radially outwardly open flow duct which extends in a circumferential direction and is delimited by an inner ring bottom wall and two inner ring side walls, and with a multiplicity of vane platforms, which receive guide vanes, are arranged along an outer circumference of the inner ring, and each have retaining webs which retaining webs project radially inward, are spaced apart from one another in an axial direction, and fit around the two inner ring side walls from the outside and thereby position the inner ring therebetween, wherein wear elements are inserted into gaps which are present between the retaining webs and the two inner ring side walls arranged directly adjacent to the retaining webs.

2. The guide vane ring as claimed in claim 1, wherein the wear elements are of plate-shaped design.

3. The guide vane ring as claimed in claim 1, wherein the wear elements are produced from a material from which the inner ring is manufactured or from a softer material.

4. The guide vane ring as claimed in claim 1, wherein each wear element is detachably connected to a retaining web or to an inner ring side wall.

5. The guide vane ring as claimed in claim 4, wherein each wear element is fastened to the retaining web or to the inner ring side wall using a screw connection.

6. The guide vane ring as claimed in claim 5, wherein each wear element has at least one welded-on threaded bolt.

7. The guide vane ring as claimed in claim 4, wherein depressions that receive wear elements are provided on inner surfaces of the retaining webs and/or on the outer surface of at least one inner ring side wall.

8. The guide vane ring as claimed in claim 1, wherein wear elements are inserted into gaps which are present between retaining web guide projections and the two inner ring side walls arranged directly adjacent, wherein the retaining web guide projections each project radially inward.

9. An apparatus, comprising:

a portion of an outer guide vane ring;

a portion of an inner guide vane ring disposed radially inside the portion of the outer guide vane ring;

a guide vane comprising: an outer platform that is secured to the portion of the outer guide vane ring; an inner platform that is secured to the portion of the inner guide vane ring; and an airfoil connected to the outer platform and to the inner platform;

retaining webs that extend radially inward from the inner platform, wherein a first retaining web and a second retaining web of the retaining webs are disposed on opposite sides of the inner guide vane ring; and a wear element disposed between and in direct contact with the first retaining web and the portion of the inner guide vane ring.

10. The apparatus of claim 9, wherein the first retaining web comprises a circumferentially extending base and retaining web guide projections, wherein the retaining web guide projections extend radially inward from the base, are disposed circumferentially adjacent to each other, and that make direct contact with the wear element.

11. A guide vane ring comprising the apparatus of claim 9.

* * * * *